United States Patent
Kameo et al.

(10) Patent No.: US 11,288,374 B2
(45) Date of Patent: Mar. 29, 2022

(54) INFORMATION PROCESSING DEVICE, METHOD FOR CONTROLLING INFORMATION PROCESSING DEVICE, AND PROGRAM

(71) Applicant: MITSUBISHI HEAVY INDUSTRIES MACHINERY SYSTEMS, LTD., Kobe (JP)

(72) Inventors: Naruhisa Kameo, Tokyo (JP); Hiromichi Nakamoto, Tokyo (JP); Hiroyuki Nakayama, Tokyo (JP)

(73) Assignee: MITSUBISHI HEAVY INDUSTRIES MACHINERY SYSTEMS. LTD., Kobe (JP)

( * ) Notice: Subject to any disclaimer, the term of this patent is extended or adjusted under 35 U.S.C. 154(b) by 202 days.

(21) Appl. No.: 16/758,125

(22) PCT Filed: Oct. 31, 2017

(86) PCT No.: PCT/JP2017/039418
§ 371 (c)(1),
(2) Date: Apr. 22, 2020

(87) PCT Pub. No.: WO2019/087309
PCT Pub. Date: May 9, 2019

(65) Prior Publication Data
US 2020/0285751 A1 Sep. 10, 2020

(51) Int. Cl.
*G06F 9/00* (2006.01)
*G06F 21/57* (2013.01)
(Continued)

(52) U.S. Cl.
CPC .......... *G06F 21/575* (2013.01); *G06F 9/4401* (2013.01); *G06F 12/1408* (2013.01);
(Continued)

(58) Field of Classification Search
CPC .. G06F 21/575; G06F 9/4401; G06F 12/1408; G06F 2212/1052; H04N 19/423; H04N 19/61; H04N 19/44
(Continued)

(56) References Cited

U.S. PATENT DOCUMENTS 10,388,392 B2 * 8/2019 Aberl .................. G06F 11/1068
10,867,655 B1 * 12/2020 Harms ................. G11C 11/221
(Continued)

FOREIGN PATENT DOCUMENTS

JP  S59-173847 A  10/1984
JP  S61-051251 A   3/1986
(Continued)

OTHER PUBLICATIONS

PCT/ISA/210, "International Search Report for International Application No. PCT/JP2017/039418," dated Jan. 23, 2018.
(Continued)

*Primary Examiner* — Volvick Derose
(74) *Attorney, Agent, or Firm* — Manabu Kanesaka; Benjamin Hauptman; Kenneth Berner

(57) ABSTRACT

An information processing device (1) includes: a decoding circuit (12b), provided on a data bus (DB) for connecting a main memory (101) and an external storage device (11), which is capable of switching between enabling and disabling a process for decoding information that is transmitted through the data bus (DB); and a CPU (100) that is configured to read out information written in the external storage device (11) into the main memory (101). The CPU (100) is configured to enable the decoding process of the decoding circuit 12b in a case where a snapshot image of the main memory 101 is read out as the information written in the external storage device (11).

7 Claims, 7 Drawing Sheets

(51) Int. Cl.
*H04N 19/423* (2014.01)
*H04N 19/61* (2014.01)
*G06F 9/4401* (2018.01)
*G06F 12/14* (2006.01)

(52) U.S. Cl.
CPC .......... *H04N 19/423* (2014.11); *H04N 19/61* (2014.11); *G06F 9/4411* (2013.01)

(58) Field of Classification Search
USPC .......................................................... 713/2
See application file for complete search history.

(56) References Cited

U.S. PATENT DOCUMENTS

| | | | |
|---|---|---|---|
| 2004/0146270 A1* | 7/2004 | Proust | H04N 21/435 386/240 |
| 2005/0044433 A1 | 2/2005 | Dunstan | |
| 2006/0236147 A1* | 10/2006 | Best | G06F 1/12 713/400 |
| 2008/0046705 A1* | 2/2008 | Hirai | G06F 9/4405 713/1 |
| 2008/0201592 A1 | 8/2008 | Lawrence et al. | |
| 2008/0244028 A1* | 10/2008 | Le | G06F 3/0607 709/208 |
| 2008/0256352 A1* | 10/2008 | Chow | G11C 11/5621 713/2 |
| 2008/0282052 A1* | 11/2008 | Ma | G06F 9/4401 711/202 |
| 2008/0301467 A1 | 12/2008 | Saito | |
| 2009/0198929 A1* | 8/2009 | Saika | G06F 21/805 711/162 |
| 2009/0222636 A1* | 9/2009 | Yano | G06F 12/0866 711/166 |
| 2010/0005282 A1* | 1/2010 | Smith | G06F 11/1068 713/2 |
| 2010/0251074 A1* | 9/2010 | Chu | G06F 11/1068 714/773 |
| 2011/0087896 A1 | 3/2011 | Baldwin et al. | |
| 2011/0231629 A1* | 9/2011 | Shiraishi | H03M 7/3086 711/206 |
| 2012/0144252 A1* | 6/2012 | Takada | G06F 11/2089 714/702 |
| 2012/0324241 A1 | 12/2012 | Oshida et al. | |
| 2014/0122803 A1* | 5/2014 | Kato | G06F 9/4418 711/118 |
| 2014/0164725 A1* | 6/2014 | Jang | G06F 21/575 711/163 |
| 2014/0214771 A1* | 7/2014 | Ogata | G06F 3/0689 707/649 |
| 2015/0205619 A1* | 7/2015 | Kato | G06F 9/4418 713/2 |
| 2015/0280749 A1* | 10/2015 | Gjorup | G06F 11/1072 714/752 |
| 2016/0224272 A1* | 8/2016 | Kim | G11C 11/40615 |
| 2018/0129561 A1* | 5/2018 | Niu | G06F 11/1048 |
| 2018/0158507 A1* | 6/2018 | Bang | G11C 11/40611 |
| 2019/0096508 A1* | 3/2019 | Kim | G11C 29/1201 |
| 2019/0303303 A1* | 10/2019 | Krishnan | G06F 12/0833 |

FOREIGN PATENT DOCUMENTS

| | | |
|---|---|---|
| JP | 2005-086670 A | 3/2005 |
| JP | 2008-204459 A | 9/2008 |
| JP | 2008-299611 A | 12/2008 |
| JP | 2010-113615 A | 5/2010 |
| JP | 2013-005314 A | 1/2013 |
| JP | 2013-507715 A | 3/2013 |
| JP | 2015-156205 A | 8/2015 |

OTHER PUBLICATIONS

PCT/ISA/237, "Written Opinion of the International Searching Authority for International Application No. PCT/JP2017/039418," dated Jan. 23, 2018.

Suzuki Tomoo et al., Get! CompTIA Security+ Required subjects of security society (Exam No. SYO-401), the first edition, Uchida Human Development Co., Ltd., Oct. 1, 2015.

\* cited by examiner

INFORMATION PROCESSING DEVICE, METHOD FOR CONTROLLING INFORMATION PROCESSING DEVICE, AND PROGRAM

RELATED APPLICATIONS

The present application is National Phase of International Application No. PCT/JP2017/039418 filed Oct. 31, 2017, the disclosure of which is hereby incorporated by reference herein in its entirety.

TECHNICAL FIELD

The present invention relates to an information processing device, a method for controlling an information processing device, and program.

BACKGROUND ART

In various information processing devices such as a car navigation system or a game console, there is a need to use functions of the information processing devices immediately after startup operations (power-on operations) thereof are performed.

Patent Document 1 discloses a technique in which the high-speed startup of an information processing device is realized by storing data indicating a storage state of a volatile memory immediately before power is turned off, a register value of a peripheral device, and a register value of a processor in a non-volatile memory, and reproducing a state before power-off using the data stored in the non-volatile memory when power is turned on again.

CITATION LIST

Patent Literature

Patent Document 1

Japanese Unexamined Patent Application, First Publication No. 2015-156205

SUMMARY OF INVENTION

Technical Problem

Since data stored in a non-volatile memory (a snapshot image of a volatile memory) for the purpose of performing high-speed startup is normally not encoded, the data is at risk of being easily stolen by a third party. As a countermeasure, encoding a snapshot image of a volatile memory and then storing it in a non-volatile memory can be considered.

However, in such a case, it is necessary to decode an encoded snapshot image when power is turned on again, and then to load the decoded snapshot image into a volatile memory or the like. In this case, it takes a processing time to decode a snapshot image, which results in the possibility of decreasing the effect of high-speed startup.

In view of the above problem, the present invention provides an information processing device, a method for controlling an information processing device, and a program that make it possible to enable high-speed startup and to enhance security performance.

Solution to Problem

According to a first aspect of the present invention, there is provided an information processing device (1) including: a decoding circuit (12b), provided on a data bus (DB) for connecting a main memory (101) and an external storage device (11), which is capable of switching between enabling and disabling a process for decoding information that is transmitted through the data bus; and a readout processing unit (1002) that is configured to read out information written in the external storage device in the main memory. In addition, the readout processing unit is configured to enable the decoding process of the decoding circuit in a case where a snapshot image of the main memory is read out as the information written in the external storage device.

In this manner, when the snapshot image is read out into the main memory immediately after power-on, the encoded snapshot image is decoded at a high speed by the decoding circuit configured as hardware in a process in which the snapshot image is transmitted on the data bus from the external storage device toward the main memory. Therefore, it is possible to read out the encoded snapshot image without decreasing the effect of high-speed startup.

In addition, according to a second aspect of the present invention includes: an encoding circuit (12a), provided on the data bus, which is capable of switching between enabling and disabling a process for encoding the information that is transmitted through the data bus; and a writing processing unit that writes information stored in the main memory in the external storage device. In addition, the writing processing unit is configured to enable the encoding process of the encoding circuit in a case where a snapshot image of the main memory is written as the information stored in the main memory.

In this manner, when a snapshot image is written in the external storage device 11 immediately before power-off, a plaintext snapshot image is encoded at a high speed by the encoding circuit 12a configured as hardware in a process in which the snapshot image is transmitted on the data bus DB from the main memory-side device 10 toward the external storage device 11. Therefore, it is possible to speed up encoding of a snapshot image to be written in the external storage device 11 during power-off.

In addition, according to a third aspect of the present invention, the decoding circuit includes a logical arithmetic operation element (121b) that is configured to perform the decoding process, and a selection element (120b) capable of selecting whether the information that is transmitted through the data bus passes through the logical arithmetic operation element in accordance with a control signal that is input.

In this manner, it is possible to realize a decoding circuit capable of switching between enabling and disabling a decoding process, as hardware, with an extremely simple configuration.

In addition, according to a fourth aspect of the present invention, the above-described information processing device further includes a data recording memory for decoding (13) in which data for decoding is recorded. In addition, the decoding circuit performs the process for decoding the information that is transmitted through the data bus on the basis of the data for decoding read out from the data recording memory for decoding.

In this manner, the decoding circuit can perform decoding at a high speed using data for decoding which is read out directly from a dedicated memory (a data recording memory for decoding).

In addition, according to a fifth aspect of the present invention, the data for decoding is information recorded in the main memory in an initial state immediately after power-on.

In this manner, it is possible to achieve encoding of a snapshot image on the basis of the information (PUF information) recorded in the main memory from the initial state. Thereby, it is possible to further enhance security performance of the information processing device 1.

In addition, according to a sixth aspect of the present invention, there is provided a method for controlling an information processing device including a decoding circuit, provided on a data bus for connecting a main memory and an external storage device, which is capable of switching between enabling and disabling a process for decoding information that is transmitted through the data bus includes a readout step of reading out information written in the external storage device into the main memory. In addition, the decoding process of the decoding circuit is enabled in the readout step in a case where a snapshot image of the main memory is read out as the information written in the external storage device.

In addition, according to a seventh aspect of the present invention, there is provided a program causing an information processing device including a decoding circuit that is provided on a data bus for connecting a main memory and an external storage device and is capable of switching between enabling and disabling a process for decoding information that is transmitted through the data bus to function as a readout processing unit that is configured to read out information written in the external storage device into the main memory. In addition, the readout processing unit is configured to enable the decoding process of the decoding circuit in a case where a snapshot image of the main memory is read out as the information written in the external storage device.

Advantageous Effects of Invention

According to the information processing device, the method for controlling an information processing device, and the program, it is possible to enable high-speed startup and to enhance security performance.

DESCRIPTION OF EMBODIMENTS

First Embodiment

Hereinafter, an information processing device according to a first embodiment will be described in detail with reference to FIGS. 1 to 8.

Hardware Configuration of Information Processing Device

Figure 1:
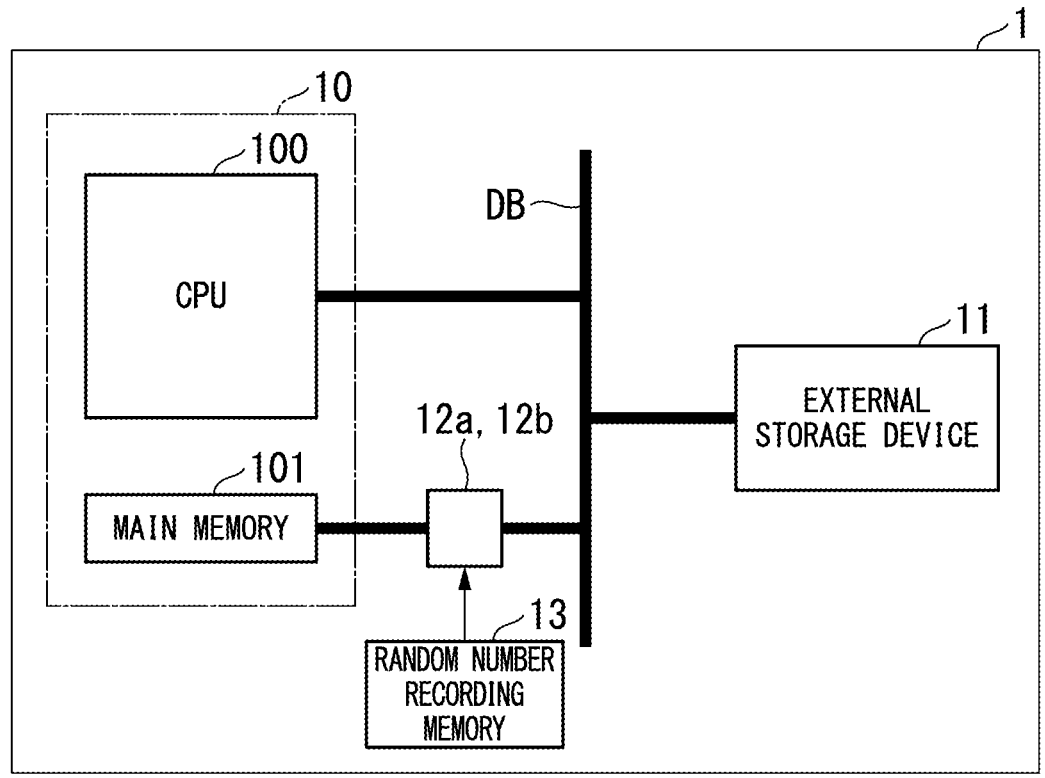
FIG. 1 is a diagram schematically showing a hardware configuration of an information processing device according to a first embodiment.

FIG. 1 is a diagram schematically showing a hardware configuration of an information processing device according to a first embodiment.

As shown in FIG. 1, an information processing device 1 includes a CPU 100, a main memory 101, an external storage device 11, an encoding circuit 12a, a decoding circuit 12b, and a random number recording memory (a data recording memory for decoding) 13. In addition, the CPU 100, the main memory 101, and the external storage device 11 are connected to each other through a data bus DB.

The CPU 100 is a processor that takes charge of an operation of the entire information processing device 1, and exhibits various functions by subsequently executing commands in accordance with a program prepared in advance. The CPU 100 executes an arithmetic operation process while accessing data and various types of commands which are read out into the main memory 101 on the basis of a program.

The main memory 101 is a volatile memory for enabling high-speed access from the CPU 100 and is also referred to as a main storage device. The main memory 101 is, for example, a dynamic random access memory (DRAM).

The external storage device 11 is a high-capacity non-volatile memory and is also referred to as an auxiliary storage device. The external storage device 11 is, for example, a hard disk drive (HDD), a solid state drive (SSD), or the like.

Meanwhile, an aspect in which the external storage device 11 according to the present embodiment is built into the information processing device 1 is described (see FIG. 1), but in another embodiment, an aspect in which the external storage device is externally attached to the information processing device 1 may be used.

In the following description, the CPU 100 and the main memory 101 are also denoted as a main memory-side device 10 collectively.

The data bus DB is a signal line for exchanging data (such as a numerical value which is a target for arithmetic operation and the result of an arithmetic operation) between the CPU 100 and the main memory 101 and between the CPU 100 and the external storage device 11.

Meanwhile, the information processing device 1 includes an address bus and a control bus (not shown in the drawing) in addition to the data bus DB. As is the case with the data bus DB, the address bus and the control bus are signal lines for connecting the CPU 100, the main memory 101 and the external storage device 11 to each other. The address bus is a signal line for designating a storage place (an address) of data intended to be written and read out in the main memory 101 and the external storage device 11. In addition, the control bus is a signal line for designating whether data is read out from or written in a storage place designated in the address bus.

The encoding circuit 12a is a logic circuit, provided on the data bus DB, which performs a process for encoding information transmitted through the data bus DB. The encoding circuit 12a is configured to be capable of switching between enabling and disabling an encoding process in accordance with a control signal which is separately input.

The decoding circuit 12b is a logic circuit, provided on the data bus DB, which performs a process for decoding information transmitted through the data bus DB. The decoding circuit 12b is configured to be capable of switching between enabling and disabling a decoding process in accordance with a control signal which is separately input.

The random number recording memory 13 is a storage device in which random numbers generated by the CPU 100 are recorded. Here, random numbers generated by the CPU 100 serve as data for encoding used when the encoding circuit 12a performs an encoding process, and serve as data for decoding used when the decoding circuit 12b performs a decoding process. In the present embodiment, the data for encoding and the data for decoding are the same random numbers.

The random number recording memory 13 according to the present embodiment is considered to be a rewritable non-volatile memory such as a flash memory.

Functional Configuration of CPU

Figure 2:
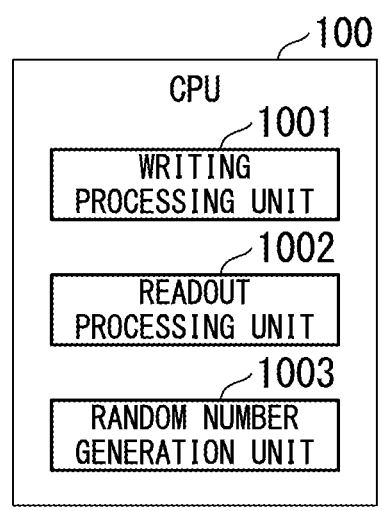
FIG. 2 is a diagram showing a functional configuration of a CPU according to the first embodiment.

FIG. 2 is a diagram showing a functional configuration of a CPU according to the first embodiment.

As shown in FIG. 2, the CPU 100 operates in accordance with a program prepared in advance, to thereby exhibit the functions of a writing processing unit 1001, a readout processing unit 1002, and a random number generation unit 1003.

The writing processing unit 1001 performs a process for writing information stored in the main memory 101 in the external storage device 11.

The readout processing unit 1002 performs a process for reading out information written in the external storage device 11 into the main memory 101. Here, immediately after the information processing device 1 is powered on, the CPU 100 initially reads out a program for startup (boot loader) which is set in advance. Immediately after power-on, the CPU 100 operates in accordance with the program for startup (boot loader) which is read out herein, and thus functions as the readout processing unit 1002 that reads out data stored in the external storage device 11 (a snapshot image to be described later) into the main memory 101.

The random number generation unit 1003 generates random numbers, and performs a process for storing the random numbers in the random number recording memory 13.

Figure 3:
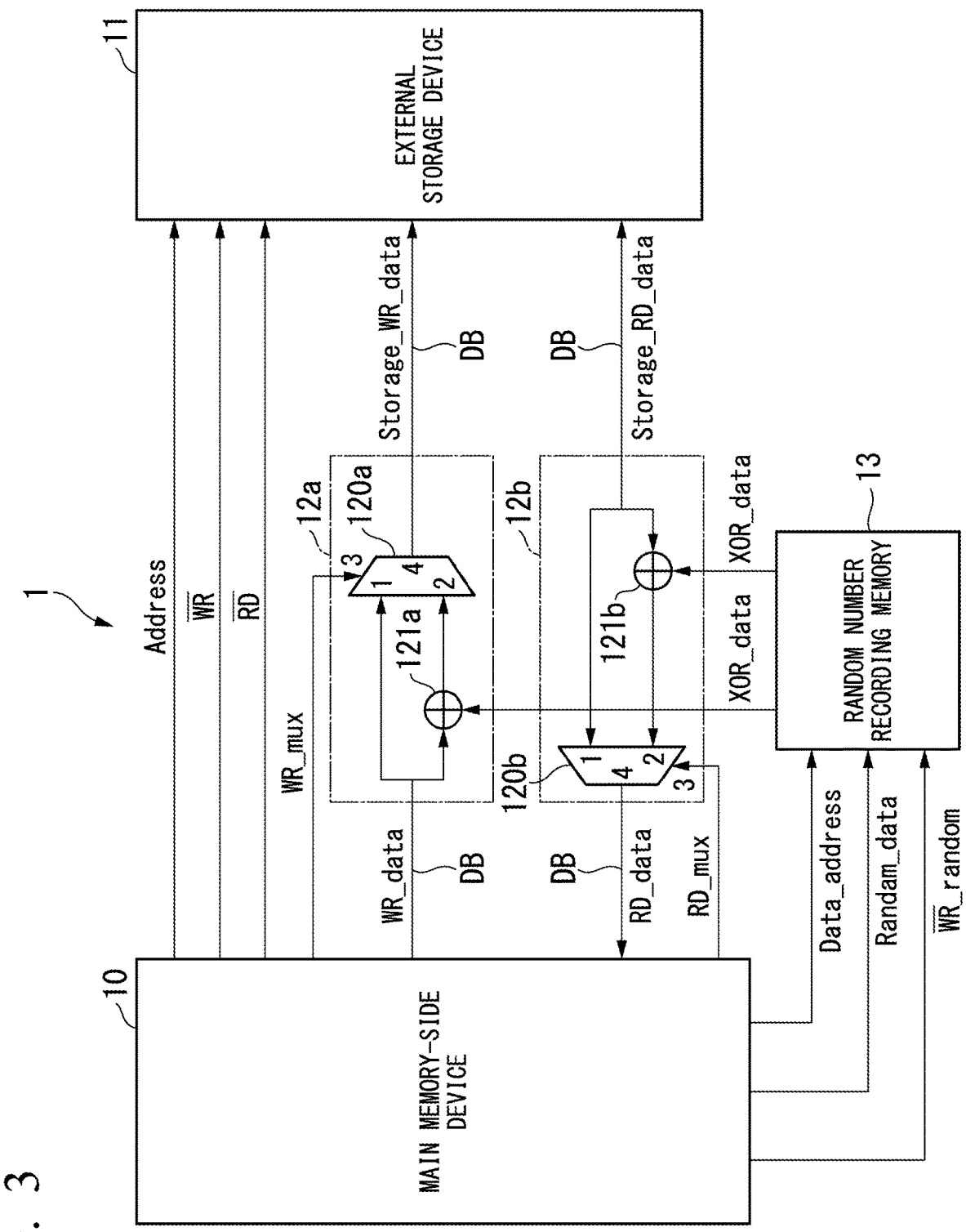
FIG. 3 is a diagram showing a functional configuration of the information processing device according to the first embodiment and a flow of various types of information.

Functional Configuration of Information Processing Device and Flow of Various Types of Information FIG. 3 is a diagram showing a functional configuration of the information processing device according to the first embodiment and a flow of various types of information.

As shown in FIG. 3, the information processing device 1 exchanges various types of information (data, an address and a control signal) between the main memory-side device 10 and the external storage device 11.

First, hardware configurations of the encoding circuit 12a and the decoding circuit 12b will be described with reference to FIG. 3.

As shown in FIG. 3, the encoding circuit 12a is configured to include a multiplexer 120a (a selection element) and a logical arithmetic operation element 121a.

The multiplexer 120a outputs information which is input to any one of two input ports [1] and [2] from an output port [4]. Specifically, in a case where a control signal WR_mux which is input to a selection port [3] is "L" (Low), the multiplexer 120a outputs information which is input to the input port [1] from the output port [4]. In addition, in a case where the control signal WR_mux which is input to the selection port is "H" (High), the multiplexer 120a outputs information which is input to the input port [2] from the output port [4].

The logical arithmetic operation element 121a is a logical arithmetic operation element that arithmetically operates an exclusive logical sum (XOR) of two pieces of information which are input.

Writing data WR_data is input to the input port [1] of the multiplexer 120a and the logical arithmetic operation element 121a. The writing data WR_data is information which is transmitted from the main memory-side device 10 through the data bus DB toward the external storage device 11, and is information which is output as information to be written in the external storage device 11 by the CPU 100 (the writing processing unit 1001).

Data for encoding XOR_data recorded in the random number recording memory 13 is further input to the logical arithmetic operation element 121a. The data for encoding XOR_data is information which is used for an encoding process in the encoding circuit 12a, and is specifically information which is a target for the arithmetic operation of an exclusive logical sum (XOR) together with the writing data WR_data in the logical arithmetic operation element 121a.

An arithmetic operation result of the exclusive logical sum of the writing data WR_data and the data for encoding XOR_data by the logical arithmetic operation element 121a is input to the input port [2] of the multiplexer 120a.

Storage device writing data Storage_WR_data is output from the output port [4] of the multiplexer 120a. The storage device writing data Storage_WR_data is information which is actually written in the external storage device 11. In a case where the control signal WR_mux which is input to the selection port [3] of the multiplexer 120a is "L," the storage device writing data Storage_WR_data becomes the writing data WR_data itself. That is, in a case where the control signal WR_mux is "L," the encoding process of the encoding circuit 12a is disabled. On the other hand, in a case where the control signal WR_mux which is input to the selection port [3] of the multiplexer 120a is "H," the storage device writing data Storage_WR_data becomes an arithmetic operation result of the exclusive logical sum by the logical arithmetic operation element 121a. That is, in a case where the control signal WR_mux is "H," the encoding process of the encoding circuit 12a is enabled.

In addition, as shown in FIG. 3, the decoding circuit 12b is configured to include a multiplexer 120b (a selection element) and a logical arithmetic operation element 121b.

The multiplexer 120b outputs information which is input to any one of two input ports [1] and [2] from an output port [4]. Specifically, in a case where a control signal RD_mux which is input to a selection port [3] is "H" (High), the multiplexer 120b outputs information which is input to the input port [2] from the output port [4]. In addition, in a case where the control signal RD_mux which is input to the selection port is "L" (Low), the multiplexer 120*b* outputs information which is input to the input port [1] from the output port [4].

The logical arithmetic operation element 121*b* is a logical arithmetic operation element that arithmetically operates an exclusive logical sum (XOR) of two pieces of information which are input.

Storage device readout data Storage_RD_data is input to the input port [1] of the multiplexer 120*b* and the logical arithmetic operation element 121*b*. The storage device readout data Storage_RD_data is information which is transmitted from the external storage device 11 through the data bus DB toward the main memory-side device 10, and is information which is output as information to be read out into the main memory 101 by the CPU 100 (the readout processing unit 1002).

Data for decoding XOR_data recorded in the random number recording memory 13 is further input to the logical arithmetic operation element 121*b* (since data for decoding according to the present embodiment is the same information as the data for encoding, the data for decoding will be described with the same reference sign as that of the data for encoding (XOR_data) assigned thereto). The data for decoding XOR_data is information which is used for a decoding process in the decoding circuit 12*b*, and is specifically information which is a target for the arithmetic operation of an exclusive logical sum (XOR) together with the storage device readout data Storage_RD_data in the logical arithmetic operation element 121*b*.

An arithmetic operation result of the exclusive logical sum of the storage device readout data Storage_RD_data and the data for decoding XOR_data by the logical arithmetic operation element 121*b* is input to the input port [2] of the multiplexer 120*b*.

Readout data RD_data is output from an output port [4] of the multiplexer 120*b*. The readout data RD_data is information which is actually read out (loaded) into the main memory 101. In a case where the control signal RD_mux which is input to the selection port [3] of the multiplexer 120*b* is "L," the readout data RD_data becomes the storage device readout data Storage_RD_data itself. That is, in a case where the control signal RD_mux is "L," the decoding process of the decoding circuit 12*b* is disabled. On the other hand, in a case where the control signal RD_mux which is input to the selection port [3] of the multiplexer 120*b* is "H," the readout data RD_data becomes an arithmetic operation result of the exclusive logical sum by the logical arithmetic operation element 121*b*. That is, in a case where the control signal RD_mux is "H," the decoding process of the decoding circuit 12*b* is enabled.

In FIG. 3, address information Address is information which is transmitted from the main memory-side device 10 through the address bus to the external storage device 11, and is information for designating a storage place (an address) of data to be written in and read out from the external storage device 11.

A writing control signal WR# is information which is transmitted from the main memory-side device 10 through the control bus to the external storage device 11, and is a signal for giving an instruction for writing the storage device writing data Storage_WR_data in a storage place which is designated in the address information Address of the external storage device 11.

A readout control signal RD# is information which is transmitted from the main memory-side device 10 through a control bus to the external storage device 11, and is a signal for giving an instruction for reading out the storage device readout data Storage_RD_data stored in a storage place which is designated in the address information Address of the external storage device 11.

Next, various types of information which are output from the main memory-side device 10 to the random number recording memory 13 will be described.

Random number recording memory address information Data_address is information for designating a storage place for storage of random numbers (random numbers Random_data) generated by the CPU 100 (the random number generation unit 1003).

The random numbers Random_data are random numbers generated by the CPU 100 (the random number generation unit 1003).

A random number recording memory writing control signal WR#_random is a signal for giving an instruction for writing the random numbers Random_data in a storage place which is designated in the random number recording memory address information Data_address of the random number recording memory 13.

First Process Flow of Information Processing Device

Figure 4:
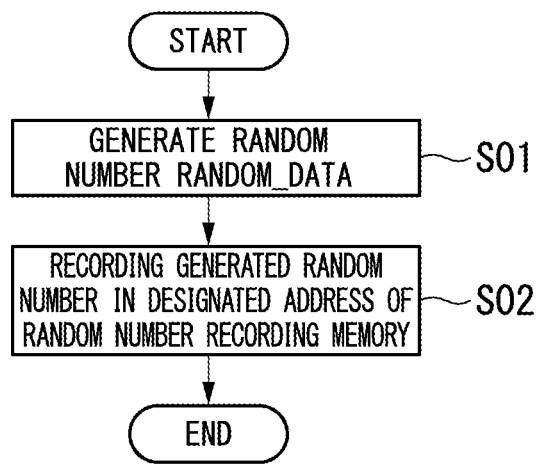
FIG. 4 is a diagram showing a first process flow of the information processing device according to the first embodiment.

FIG. 4 is a diagram showing a first process flow of the information processing device according to the first embodiment.

Figure 5:
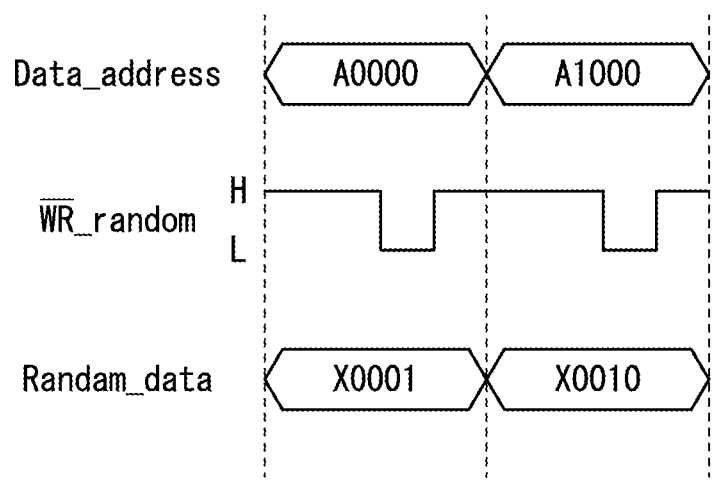
FIG. 5 is a diagram showing operations relating to the first process flow of the information processing device according to the first embodiment.

In addition, FIG. 5 is a diagram showing operations relating to the first process flow of the information processing device according to the first embodiment in detail.

The first process flow shown in FIG. 4 shows a flow of processes for recording random numbers (data for encoding and data for decoding) in the random number recording memory 13 in advance during a normal operation in order to enable high-speed startup after power-off.

As shown in FIG. 4, the random number generation unit 1003 of the CPU 100 generates the random number Random_data during a normal operation of the information processing device 1 (step S01).

Next, the random number generation unit 1003 records the generated random number Random_data in a designated address of the random number recording memory 13 (step S02).

For example, as shown in FIG. 5, the random number generation unit 1003 outputs random number recording memory address information Data_address "A0000" and a random number Random_data "X0001." The random number generation unit 1003 transitions the random number recording memory writing control signal WR#_random from "H" to "L," so that the random number "X0001" is written in the address "A0000" of the random number recording memory 13.

The random number generation unit 1003 writes another random number Random_data (for example, "X0010") generated similarly with respect to another address (for example, "A0001") of the random number recording memory 13.

The random number Random_data recorded in the random number recording memory 13 in this manner is read out from the random number recording memory 13, as the data for encoding XOR_data and the data for decoding XOR_data, during writing and reading out of a snapshot image of the main memory 101.

Second Process Flow of Information Processing Device

Figure 6:
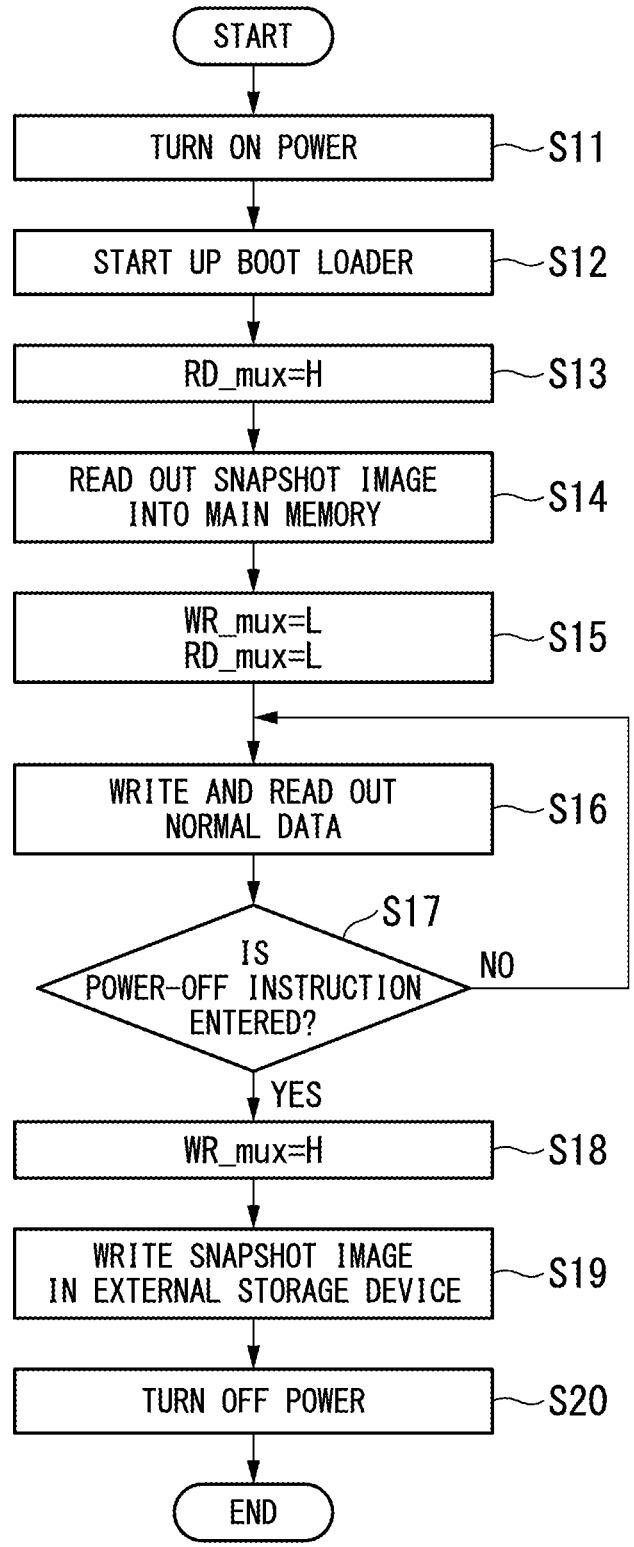
FIG. 6 is a diagram showing a second process flow of the information processing device according to the first embodiment.

FIG. 6 is a diagram showing a second process flow of the information processing device according to the first embodiment.

Figure 7:
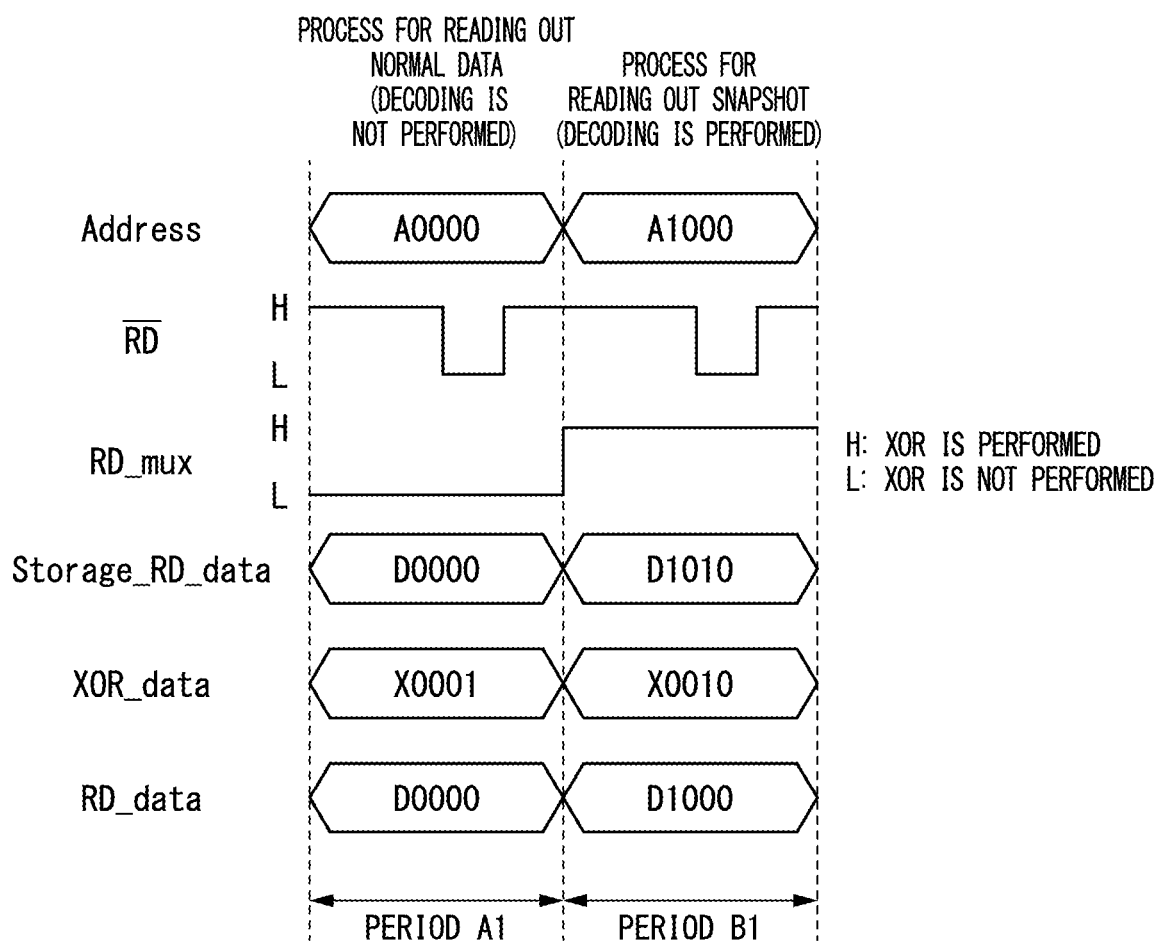
FIG. 7 is a diagram showing operations relating to the second process flow of the information processing device according to the first embodiment in detail.
Figure 8:
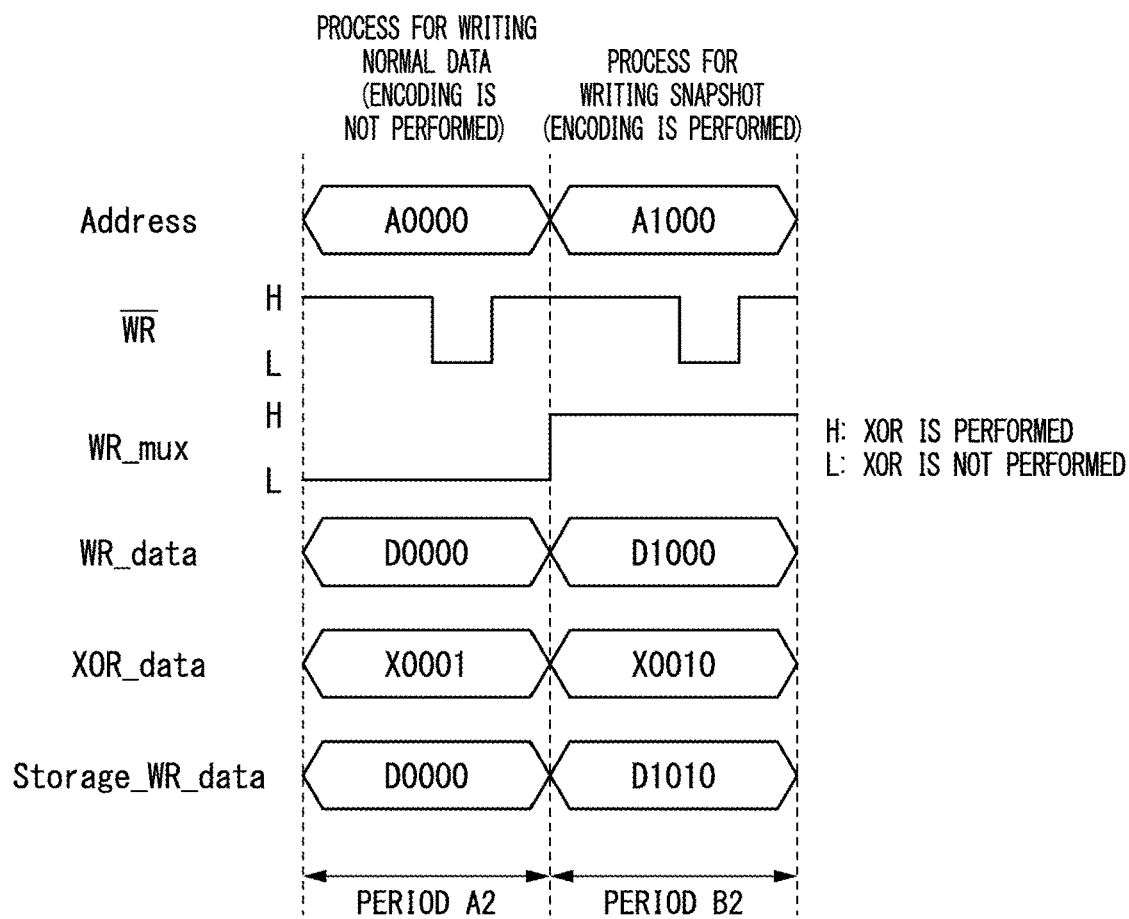
FIG. 8 is a diagram showing operations relating to the second process flow of the information processing device according to the first embodiment in detail.

In addition, FIGS. 7 and 8 are diagrams showing operations relating to the second process flow of the information processing device according to the first embodiment in detail.

The second process flow shown in FIG. 6 shows a flow of a series of processes of the information processing device 1 until the power is turned on and the power is turned off again.

First, the information processing device 1 in a state of power-off is powered on by a user's operation or the like (step S11).

When the power is turned on, the CPU 100 accesses a predetermined storage area (such as a dedicated ROM or a flash memory which is not shown FIG. 1), and reads out a program for startup for operating a boot loader (step S12).

The readout processing unit 1002 of the CPU 100 that operates as a boot loader sets the control signal RD_mux which is input to the multiplexer 120*b* of the decoding circuit 12*b* to be in a "H" state (step S13).

Next, the readout processing unit 1002 reads out a snapshot image of the main memory 101 from the external storage device 11 (step S14). The snapshot image is information indicating the storage state of data in all the storage areas (or a part of storage areas) of the main memory 101 immediately before the information processing device 1 is powered off. As will be described later, the snapshot image is written in a specified storage area of the external storage device 11 by the CPU 100 (the readout processing unit 1002) immediately before the information processing device 1 is powered off.

The process of step S14 described above will be described in detail with reference to FIG. 7.

A snapshot image readout process which is performed by the readout processing unit 1002 in step S14 of FIG. 6 is as shown in a period B1 of FIG. 7.

That is, the readout processing unit 1002 outputs address information Address indicating an address in which a snapshot image is written (for example, an address corresponding to "A1000") to the external storage device 11 in a state where the control signal RD_mux of the multiplexer 120*b* is maintained to be "H." Meanwhile, an address of the external storage device 11 in which the snapshot image of the main memory 101 is written is set in advance. In addition, an address of the external storage device 11 to be designated in order to read out a snapshot image is described in advance in the program for startup (the boot loader).

Here, as shown in the period B1 of FIG. 7, storage device readout data Storage_RD_data (a snapshot image) "D1010" is written in the address corresponding to "A1000" of the external storage device 11. In addition, data for decoding XOR_data "X0010" is written in the address corresponding to "A1000" of the random number recording memory 13 (the address corresponding to the address "A1000" of the external storage device 11). In this case, when the readout processing unit 1002 transitions the readout control signal RD# from "H" to "L," the storage device readout data Storage_RD_data "D1010" is output from the external storage device 11, the data for decoding XOR_data "X0010" is output from the random number recording memory 13. As a result, the logical arithmetic operation element 121*b* of the decoding circuit 12*b* arithmetically operates an exclusive logical sum of the information at once, and outputs its result. As shown in the period B1 of FIG. 7, since the control signal RD_mux which is input to the multiplexer 120*b* is "H," the readout data RD_data which is output from the multiplexer 120*b* becomes an exclusive logical sum (D1000) of the storage device readout data Storage_RD_data (D1010) and the data for decoding XOR_data (X0010). That is, a snapshot image (D1000) in which decoding has been performed on an encoded snapshot image (D1010) by the decoding circuit 12*b* is input to the main memory-side device 10.

Referring back to FIG. 6, the readout processing unit 1002 reads out a snapshot image into the main memory 101, and completes high-speed startup by restoring a state immediately before the power is turned off. When the high-speed startup is completed, the CPU 100 can perform a normal operation based on an OS and an application program. In a step in which the normal operation based on an OS and an application program can be performed, the CPU 100 sets both the control signal WR_mux and the control signal RD_mux to be "L" (step S15).

When step S15 is completed, the CPU 100 reads out and writes normal data in the external storage device 11 on the basis of an OS and an application program in order to exhibit an original function as the information processing device 1 (step S16).

The process of step S16 described above will be described in detail with reference to FIGS. 7 and 8.

A process for reading out normal data which is performed by the readout processing unit 1002 in step S16 of FIG. 6 is as shown in a period A1 of FIG. 7.

That is, the readout processing unit 1002 outputs address information Address indicating an address in which normal data is written (for example, an address "A0000") to the external storage device 11 in a state where the control signal RD_mux of the multiplexer 120*b* is maintained to be "L."

Here, as shown in the period A1 of FIG. 7, storage device readout data Storage_RD_data (normal data) "D0000" is written in the address "A0000" of the external storage device 11. In addition, data for decoding XOR_data "X0001" is written in the address "A0000" of the random number recording memory 13 (the address corresponding to the address "A0000" of the external storage device 11). In this case, when the readout processing unit 1002 transitions the readout control signal RD# from "H" to "L," the storage device readout data Storage_RD_data "D0000" is output from the external storage device 11, and the data for decoding XOR_data "X0001" is output from the random number recording memory 13. In this case, the logical arithmetic operation element 121*b* of the decoding circuit 12*b* arithmetically operates an exclusive logical sum of the information at once, and outputs its result. However, since the control signal RD_mux which is input to the multiplexer 120*b* in the period A1 is "L," the readout data RD_data which is output from the multiplexer 120*b* becomes the storage device readout data Storage_RD_data (D0000) itself which is output without going through the logical arithmetic operation element 121*b*. That is, in this case, the normal data (D0000) itself which is output from the external storage device 11 is input to the main memory-side device 10.

On the other hand, a process for writing normal data which is performed by the writing processing unit 1001 in step S16 of FIG. 6 is as shown in a period A2 of FIG. 8.

That is, the writing processing unit 1001 outputs address information Address indicating an address in which normal data is to be written (for example, an address "A0000") to the external storage device 11 in a state where the control signal WR_mux of the multiplexer 120a is maintained to be "L."

Here, as shown in the period A2 of FIG. 8, writing data WR_data (normal data) "D0000" which is output from the main memory-side device 10 is to be written in the address "A0000" of the external storage device 11. In addition, data for encoding XOR_data "X0001" is written in the address "A0000" of the random number recording memory 13 (the address corresponding to the address "A0000" of the external storage device 11). In this case, when the writing processing unit 1001 transitions the writing control signal WR# from "H" to "L," the writing data WR_data "D0000" is output from the main memory-side device 10, and the data for encoding XOR_data "X0001" is output from the random number recording memory 13. In this case, the logical arithmetic operation element 121a of the encoding circuit 12a arithmetically operates an exclusive logical sum of the information at once, and outputs its result. However, since the control signal WR_mux which is input to the multiplexer 120a in the period A2 is "L," the storage device writing data Storage_WR_data which is output from the multiplexer 120a becomes the writing data WR_data (D0000) itself which is output without going through the logical arithmetic operation element 121a. That is, the normal data (D0000) itself which is output from the main memory-side device 10 is input to the external storage device 11.

In this manner, the CPU 100 of which startup is completed sets both the control signal WR_mux and the control signal RD_mux to be "L" in step S15, and thus can write and read out normal data without an encoding process and a decoding process between the external storage device 11 and the CPU in the normal process of step S16.

The CPU 100 determines whether a power-off instruction (such as, for example, a user's pressing of a power OFF button) has been input to the information processing device 1 (step S17). In a case where the power-off instruction is not input (step S17: NO), the CPU 100 reads out and writes normal data from and in the external storage device 11 in a normal process as the information processing device 1. On the other hand, in a case where the power-off instruction is input (step S17: YES), the CPU 100 performs a process for writing and saving the snapshot image of the main memory 101 in the external storage device 11, as follows, before the power is actually turned off.

Specifically, the writing processing unit 1001 first sets the control signal WR_mux which is input to the multiplexer 120a of the encoding circuit 12a to be "H" (step S18).

The writing processing unit 1001 then writes the snapshot image of the main memory 101 in the external storage device 11 (step S19).

When writing the snapshot image is completed, the CPU 100 turns the power off (step S20).

The process of step S19 described above will be described in detail with reference to FIG. 8.

A process for reading out a snapshot image which is performed by the writing processing unit 1001 in step S19 of FIG. 6 is as shown in a period B2 of FIG. 8.

That is, the writing processing unit 1001 outputs address information Address indicating an address in which a snapshot image is to be written (for example, an address "A1000") to the external storage device 11 in a state where the control signal WR_mux of the multiplexer 120a is maintained to be "H." Meanwhile, as described above, an address of the external storage device 11 in which the snapshot image of the main memory 101 is written is set in advance.

Here, as shown in the period B2 of FIG. 8, writing data WR_data (snapshot image) "D1000" is to be written in the address "A1000" of the external storage device 11. In addition, data for encoding XOR_data "X0010" is written in the address "A1000" of the random number recording memory 13 (the address corresponding to the address "A1000" of the external storage device 11). In this case, when the writing processing unit 1001 transitions the writing control signal WR# from "H" to "L," the writing data WR_data "D1000" is output from the main memory-side device 10, and the data for encoding XOR_data "X0010" is output from the random number recording memory 13. As a result, the logical arithmetic operation element 121a of the encoding circuit 12a arithmetically operates an exclusive logical sum of the information at once, and outputs its result. As shown in the period B2 of FIG. 8, since the control signal WR_mux which is input to the multiplexer 120a is "H," the storage device writing data Storage_WR_data which is output from the multiplexer 120a becomes an exclusive logical sum (D1010) of the writing data WR_data (D1000) and the data for encoding XOR_data (X0010). That is, a snapshot image (D1010) in which encoding has been performed on a plaintext (non-encoded) snapshot image (D1000) by the encoding circuit 12a is input to the external storage device 11.

Operation and Effect

As described above, the information processing device 1 according to the first embodiment is provided on the data bus DB for connecting the main memory 101 and the external storage device 11, and includes the decoding circuit 12b capable of switching between enabling and disabling a process for decoding information which is transmitted through the data bus DB and the readout processing unit 1002 (the CPU 100) that reads out information written in the external storage device 11 into the main memory 101. In a case where a snapshot image of the main memory 101 is read out as the information written in the external storage device 11, the readout processing unit 1002 enables the decoding process of the decoding circuit 12b.

In this manner, when the snapshot image is read out into the main memory 101 immediately after power-on, the encoded snapshot image is decoded at a high speed by the decoding circuit 12b configured as hardware in a process in which the snapshot image is transmitted on the data bus DB from the external storage device 11 toward the main memory-side device 10.

In addition, when normal data is read out from the external storage device 11 after an OS and an application program are started up, the decoding process of the decoding circuit 12b is disabled, and then the normal data is transmitted on the data bus DB from the external storage device 11 toward the main memory-side device 10.

However, according to the information processing device 1 of the first embodiment, since the encoded snapshot image can be read out without decreasing the effect of high-speed startup, it is possible to enable high-speed startup, and to enhance security performance.

In addition, the information processing device 1 according to the first embodiment is provided on the data bus DB, and includes the encoding circuit 12a capable of switching between enabling and disabling a process for encoding information which is transmitted through the data bus DB and the writing processing unit 1001 (the CPU 100) that writes information stored in the main memory 101 in the external storage device 11. In a case where a snapshot image of the main memory 101 is written as the information stored in the main memory 101, the writing processing unit 1001 enables the encoding process of the encoding circuit 12a.

In this manner, when the information processing device 1 writes a snapshot image in the external storage device 11 immediately before power-off, a plaintext snapshot image is encoded at a high speed by the encoding circuit 12a configured as hardware in a process in which the snapshot image is transmitted on the data bus DB from the main memory-side device 10 toward the external storage device 11.

In addition, when normal data is written in the external storage device 11 after an OS and an application program are started up, the encoding process by the encoding circuit 12a is disabled, and then the normal data is transmitted on the data bus DB from the main memory-side device 10 toward the external storage device 11.

Therefore, according to the information processing device 1 of the first embodiment, it is possible to speed up encoding of a snapshot image to be written in the external storage device 11 during power-off.

In addition, the decoding circuit 12b is configured to include the logical arithmetic operation element 121b for performing a decoding process and the multiplexer 120b (a selection element) capable of selecting whether information which is transmitted through the data bus DB passes through the logical arithmetic operation element 121b in accordance with the control signal RD_mux which is input.

In this manner, it is possible to realize the decoding circuit 12b capable of switching between enabling and disabling a decoding process, as hardware, with an extremely simple configuration.

Similarly, the encoding circuit 12a is configured to include the logical arithmetic operation element 121a for performing an encoding process and the multiplexer 120a (a selection element) capable of selecting whether information which is transmitted through the data bus DB passes through the logical arithmetic operation element 121a in accordance with the control signal WR_mux which is input.

In this manner, it is possible to realize the encoding circuit 12a capable of switching between enabling and disabling an encoding process, as hardware, with an extremely simple configuration.

In addition, the information processing device 1 according to the first embodiment further includes the random number recording memory 13 (a data recording memory for decoding) in which the data for decoding XOR_data is recorded. The decoding circuit 12b performs a process for decoding information which is transmitted through the data bus DB on the basis of the data for decoding XOR_data which is read out from the random number recording memory 13.

In this manner, the decoding circuit 12b can perform decoding at a high speed using the data for decoding XOR_data which is read out directly from a dedicated memory (the random number recording memory 13).

In addition, the information processing device 1 according to the first embodiment further includes the random number recording memory 13 (a data recording memory for encoding) in which the data for encoding XOR_data is recorded. The encoding circuit 12a performs a process for encoding information which is transmitted through the data bus DB on the basis of the data for encoding XOR_data which is read out from the random number recording memory 13. In addition, in the present embodiment, the data for encoding XOR_data is the same as the data for decoding XOR_data.

In this manner, the encoding circuit 12a can perform encoding at a high speed using the data for encoding XOR_data which is read out directly from a dedicated memory (the random number recording memory 13).

Meanwhile, the information processing device 1 according to the first embodiment may further have the following features.

That is, the CPU 100 of the information processing device 1 first reading out a program for startup for operating a boot loader immediately after power-on (step S11 shown in FIG. 9) (step S12) has been described. However, in a step in which a register or the like of the CPU 100 is not initialized immediately after power-on, the control signal RD_mux may be output as being "H." In this case, it is assumed that the program for startup (a boot loader) is read out into the main memory 101 after the decoding process of the decoding circuit 12b is performed through the decoding circuit 12b provided on the data bus DB. In this case, it is considered that the program for startup is destroyed by an unintended decoding process (a conversion process), and is not normally started up.

Consequently, an aspect may be used in which a storage area having a program for startup for operating as a boot loader loaded therein (hereinafter denoted as a "storage area for a boot loader") is prepared separately from the main memory 101, and a separate data bus DB which is not provided with the decoding circuit 12b is connected to the storage area for boot loader. Thereby, the program for startup is stored in the storage area for a boot loader, as it is, through the data bus DB which is not provided with the decoding circuit 12b.

In addition, in another embodiment, an aspect may be used in which an address on the main memory 101 having a program for startup for operating as a boot loader stored therein is specified in advance, and a separate dedicated circuit (an address decoder) that inputs the address information Address is provided. In this case, the dedicated circuit forcibly sets the control signal RD_mux which is input to the multiplexer 120b to be "L" in a case where it is detected that the address information Address which is input through the address bus is the address specified in advance. In this manner, in a case where the program for startup is loaded into the main memory 101, the control signal RD_mux is always guaranteed to be "L," and thus the program is stored in the main memory 101 as it is.

Hereinbefore, the information processing device 1 according to the first embodiment has been described in detail, but the specific aspects of the information processing device 1 are not limited to those described above, and various design changes and the like can be made without departing from the scope of this invention.

For example, the encoding circuit 12a and the decoding circuit 12b have been described in an aspect in which the logical arithmetic operation elements 121a and 121b that arithmetically operate an exclusive logical sum are included, but another embodiment is not limited to this aspect.

That is, in a case where an encoding circuit 12a and a decoding circuit 12b according to another embodiment are configured, as hardware, on the data bus DB, and are configured to be capable of realizing an encoding process and a decoding process which are used as an objective, these circuits may be constituted by a logical arithmetic operation element that performs arithmetic operations other than the exclusive logical sum or a combination of multiple types of logical arithmetic operation elements.

In addition, an aspect may be used in which an information processing device 1 in another embodiment does not include the encoding circuit 12*a* configured as hardware.

That is, an aspect may be used in which, when a snapshot image of the main memory 101 is written in the external storage device 11, the information processing device 1 according to another embodiment performs encoding through the process of the CPU 100 (software process) immediately before power-off, and writes the encoded snapshot image in the external storage device 11.

Second Embodiment

Next, an information processing device according to a second embodiment will be described in detail with reference to FIGS. 9 and 10.

Functional Configuration of CPU

Figure 9:
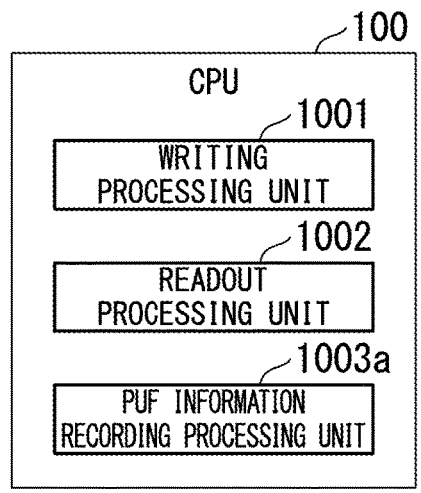
FIG. 9 is a diagram showing a functional configuration of a CPU according to a second embodiment.

FIG. 9 is a diagram showing a functional configuration of a CPU according to the second embodiment.

Meanwhile, the hardware configuration of an information processing device 1 according to the second embodiment is the same as that in the first embodiment (FIG. 1), and thus is not shown in the drawing.

As shown in FIG. 9, a CPU 100 according to the second embodiment exhibits the function of a PUF information recording processing unit 1003*a*.

The PUF information recording processing unit 1003*a* acquires physical unclonable function (PUF) information of the main memory 101, and performs a process for recording the PUF information in the random number recording memory 13. Here, the term "PUF information" refers to information recorded in the main memory 101 in an initial state (a state before initialization is performed) immediately after power-on, and to information which is generated on the basis of a slight individual difference in the electrical characteristics of a transistor or the like constituting the main memory 101. Therefore, the PUF information is information which is different for each main memory 101.

Second Process Flow of Information Processing Device

Figure 10:
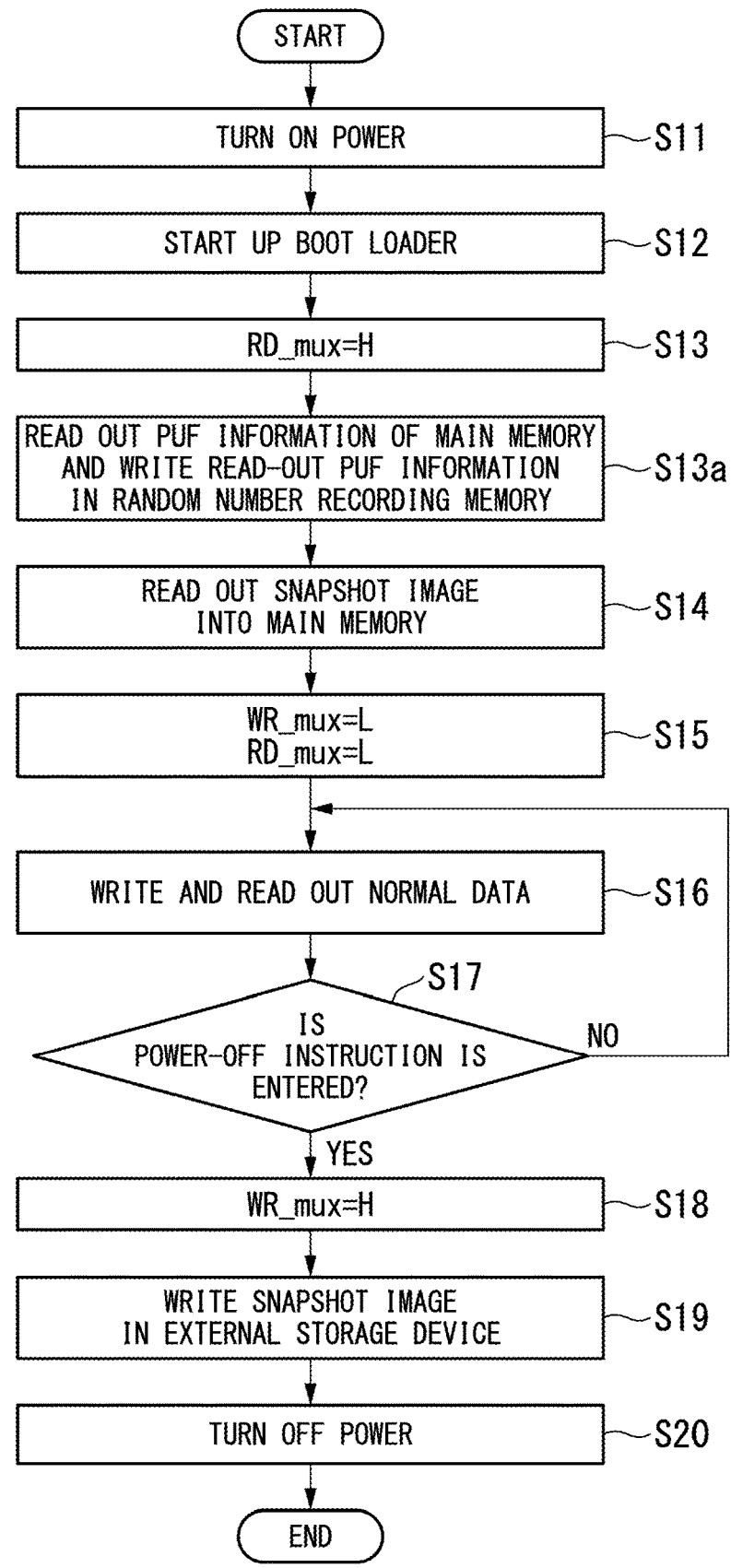
FIG. 10 is a diagram showing a second process flow of an information processing device according to the second embodiment.

FIG. 10 is a diagram showing a second process flow of the information processing device according to the second embodiment.

The second process flow of the information processing device 1 according to the second embodiment is different from that in the first embodiment in that step S13*a* is included.

That is, the PUF information recording processing unit 1003*a* of the CPU 100 (FIG. 9) reads out the PUF information from the main memory 101 immediately after power-on (step S11) before a snapshot image is read out into the main memory 101 (step S14). The PUF information recording processing unit 1003*a* records the read-out PUF information in the random number recording memory 13 (step S13*a*).

The PUF information of the main memory 101 is recorded in the random number recording memory 13 through the process of step S13*a* which is performed by the PUF information recording processing unit 1003*a*. Subsequently, as is the case with the first embodiment, the readout processing unit 1002 performs a process for reading out a snapshot image written in the external storage device 11 into the main memory 101 (step S14). Here, the PUF information (the data for decoding XOR_data) recorded in the random number recording memory 13 in step S13*a* is input to the logical arithmetic operation element 121*b* of the decoding circuit 12*b*. Thereby, the snapshot image decoded on the basis of the PUF information is read out into the main memory 101.

In addition, in a case where a power-off instruction is accepted (step S17), as is the case with the first embodiment, the writing processing unit 1001 performs a process for writing a snapshot image of the main memory 101 in the external storage device 11 (step S19). Here, the PUF information (the data for encoding XOR_data) recorded in the random number recording memory 13 in step S13*a* is input to the logical arithmetic operation element 121*a* of the encoding circuit 12*a*. Thereby, the encoded snapshot image on the basis of the PUF information is written in the external storage device 11.

Operation and Effect

As described above, according to the information processing device 1 of the second embodiment, the data for decoding and the data for encoding become the PUF information recorded in the main memory 101 in an initial state immediately after the information processing device 1 is powered on.

In this manner, it is possible to achieve encoding of a snapshot image on the basis of the information (PUF information) recorded in the main memory from the initial state. Thereby, it is possible to further enhance security performance of the information processing device 1.

Meanwhile, in second embodiment, since the PUF information is read out from the main memory 101 immediately after power-on, it is not necessary to hold the PUF information as data for decoding while the information processing device 1 is powered off. Therefore, in the second embodiment, the random number recording memory 13 needs not to be a non-volatile memory.

In addition, in each embodiment described above, various processes of the information processing device 1 described above are stored in a computer readable recording medium in a format of a program, and the various processes are performed by a computer reading out and executing this program. In addition, the term "computer readable recording medium" refers to a magnetic disc, a magnetooptic disc, a CD-ROM, a DVD-ROM, a semiconductor memory, or the like. In addition, such a computer program may be delivered to a computer through a communication line, and the computer having received this delivery may execute the program.

The program may be a program for realizing some of the above-described functions. Further, the program may be a so-called differential file (a differential program) that makes it possible to realize the above-described functions in combination with programs already recorded in a computer system.

In addition, the information processing device 1 may be constituted by one computer having all of the various functions described above, or may be constituted by a plurality of computers that have some of the functions and are communicably connected to each other.

Hereinbefore, while certain embodiments of the present invention have been described, these embodiments have been presented by way of example only, and are not intended to limit the scope of the invention. Indeed, these embodiments described herein may be embodied in a variety of other forms, and furthermore, various omissions, substitutions and changes in the form of the embodiments described herein may be made without departing from the spirit of the present invention. The appended claims and their equivalents are intended to cover such forms or modifications as would fall within the scope and spirit of the present invention.

INDUSTRIAL APPLICABILITY

According to the information processing device, the method for controlling an information processing device, and the program, it is possible to enable high-speed startup and to enhance security performance.

REFERENCE SIGNS LIST

1 Information processing device
10 Main memory-side device
100 CPU
1001 Writing processing unit
1002 Readout processing unit
1003 Random number generation unit
1003a PUF information recording processing unit
101 Main memory
11 External storage device
12a Encoding circuit
12b Decoding circuit
120a, 120b Multiplexer
121a, 121b Logical arithmetic operation element
13 Random number recording memory
DB Data bus

The invention claimed is:

1. An information processing device comprising:
a decoding circuit, provided on a data bus for connecting a main memory and an external storage device, which is capable of switching between enabling and disabling a process for decoding information that is transmitted through the data bus; and
a readout processing unit that is configured to read out information written in the external storage device into the main memory,
wherein the readout processing unit is configured to enable the decoding process of the decoding circuit in a case where a snapshot image of the main memory is read out as the information written in the external storage device.

2. The information processing device according to claim 1, further comprising:
an encoding circuit, provided on the data bus, which is capable of switching between enabling and disabling a process for encoding the information that is transmitted through the data bus; and
a writing processing unit that writes information stored in the main memory in the external storage device,
wherein the writing processing unit is configured to enable the encoding process of the encoding circuit in a case where a snapshot image of the main memory is written as the information stored in the main memory.

3. The information processing device according to claim 1, wherein the decoding circuit includes
a logical arithmetic operation element that is configured to perform the decoding process, and
a selection element capable of selecting whether the information that is transmitted through the data bus passes through the logical arithmetic operation element in accordance with a control signal that is input.

4. The information processing device according to claim 1, further comprising a data recording memory for decoding in which data for decoding is recorded,
wherein the decoding circuit performs the process for decoding the information that is transmitted through the data bus on the basis of the data for decoding read out from the data recording memory for decoding.

5. The information processing device according to claim 4, wherein the data for decoding is information recorded in the main memory in an initial state immediately after power-on.

6. A method for controlling an information processing device including a decoding circuit, provided on a data bus for connecting a main memory and an external storage device, which is capable of switching between enabling and disabling a process for decoding information that is transmitted through the data bus,
wherein the method comprises a readout step of reading out information written in the external storage device into the main memory, and
the decoding process of the decoding circuit is enabled in the readout step in a case where a snapshot image of the main memory is read out as the information written in the external storage device.

7. A non-transitory computer readable medium that records a program causing an information processing device including a decoding circuit that is provided on a data bus for connecting a main memory and an external storage device and is capable of switching between enabling and disabling a process for decoding information transmitted through the data bus to function as a readout processing unit that is configured to read out information written in the external storage device into the main memory,
wherein the readout processing unit is configured to enable the decoding process of the decoding circuit in a case where a snapshot image of the main memory is read out as the information written in the external storage device.

* * * * *